United States Patent
Hasegawa

(10) Patent No.: US 7,100,571 B1
(45) Date of Patent: Sep. 5, 2006

(54) METHOD AND APPARATUS FOR CONTROLLING ENGINE

(75) Inventor: Shumpei Hasegawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/359,543

(22) Filed: Feb. 23, 2006

(30) Foreign Application Priority Data

Feb. 25, 2005 (JP) .............................. 2005-050733

(51) Int. Cl.
*F02D 41/22* (2006.01)
*G01M 15/00* (2006.01)

(52) U.S. Cl. ..................... 123/399; 123/479; 73/118.2; 701/107

(58) Field of Classification Search ................ 123/399, 123/305, 688, 690, 479, 198 D; 73/118.2; 701/103–105, 107
See application file for complete search history.

(56) References Cited

U.S. PATENT DOCUMENTS 5,012,422 A * 4/1991 Takahashi et al. .......... 701/106
6,508,111 B1 * 1/2003 Osaki et al. ................ 73/118.1
6,779,390 B1 * 8/2004 Osaki et al. ................ 73/118.1
6,877,471 B1 * 4/2005 Tanabe et al. ......... 123/184.21

FOREIGN PATENT DOCUMENTS

| FR | 2731050 | * | 8/1996 |
| JP | 2001-159574 | * | 6/2001 |
| JP | 2003-307152 A | | 10/2003 |

* cited by examiner

*Primary Examiner*—Hai Huynh
(74) *Attorney, Agent, or Firm*—Birch, Stewart, Kolasch & Birch, LLP

(57) ABSTRACT

To provide a value to be replaced for an output of a manifold pressure sensor in case of failure of the manifold pressure sensor for detecting a manifold pressure for calculating the amount of fuel injection. An abnormality determination unit outputs an abnormal signal when an output voltage of a manifold pressure sensor is not within a predetermined range. A manifold pressure estimating unit calculates an estimated manifold pressure value on the basis of the engine revolution, a throttle opening, and an atmospheric pressure. The manifold pressure estimating unit uses the estimated value as a substitute value of the output of the manifold pressure sensor and continues to control the engine when the manifold pressure sensor has failed.

16 Claims, 5 Drawing Sheets

METHOD AND APPARATUS FOR CONTROLLING ENGINE

CROSS-REFERENCE TO RELATED APPLICATIONS

This nonprovisional application claims priority under 35 U.S.C. § 119(a) on Patent Application No. 2005-050733, filed in Japan on Feb. 25, 2005, the entirety of which is incorporated herein by reference.

BACKGROUND OF THE INVENTION

1. Field of the Invention

The present invention relates to an engine control method and apparatus. More specifically, the present invention relates to an engine control method and apparatus in which fuel injection is controlled using an intake manifold pressure value.

2. Description of Background Art

In the background art, in an engine fuel injection control system, a control method that is so-called a speed density method for calculating a basic amount of fuel injection on the basis of a negative pressure in an intake manifold (hereinafter referred to as "manifold pressure") and the engine revolution is known. A manifold pressure sensor is used for detecting the manifold pressure. In general, in order to maintain a normal system operation, a diagnostic apparatus for detecting a failure of the manifold pressure sensor is employed. For example, Japanese Patent Application Laid-Open No. 2003-307152 discloses an apparatus for determining an output signal from a sensor for sensing the intake manifold is within a preset range.

SUMMARY OF THE INVENTION

In a system having a failure diagnostic apparatus as described above, it is desirable to be able to continue an operation of the system even when the failure of the manifold pressure sensor is detected.

It is an object of an embodiment of the present invention to provide an engine control method and apparatus that enable continuation of an operation even when an abnormality occurs in the manifold pressure sensor in a system having manifold pressure sensors.

In order to achieve the above-described object, an embodiment of the present invention is directed to a method of controlling an engine having a manifold pressure sensor, an atmospheric pressure sensor, an engine revolution detector, and a throttle sensor. An estimated manifold pressure value is calculated on the basis of the engine revolution, a throttle opening, and an atmospheric pressure when the manifold pressure sensor has failed. Fuel injection control is performed by using the estimated manifold pressure value as a typical output value of the manifold pressure sensor.

According to the embodiment of the present invention having the characteristic described above, the engine can be continuously controlled with the estimated manifold pressure value in case of failure of the manifold pressure sensor in the system in which the control method employing the manifold pressure sensors is employed. Therefore, an engine controlled by the control method of the invention is highly reliable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
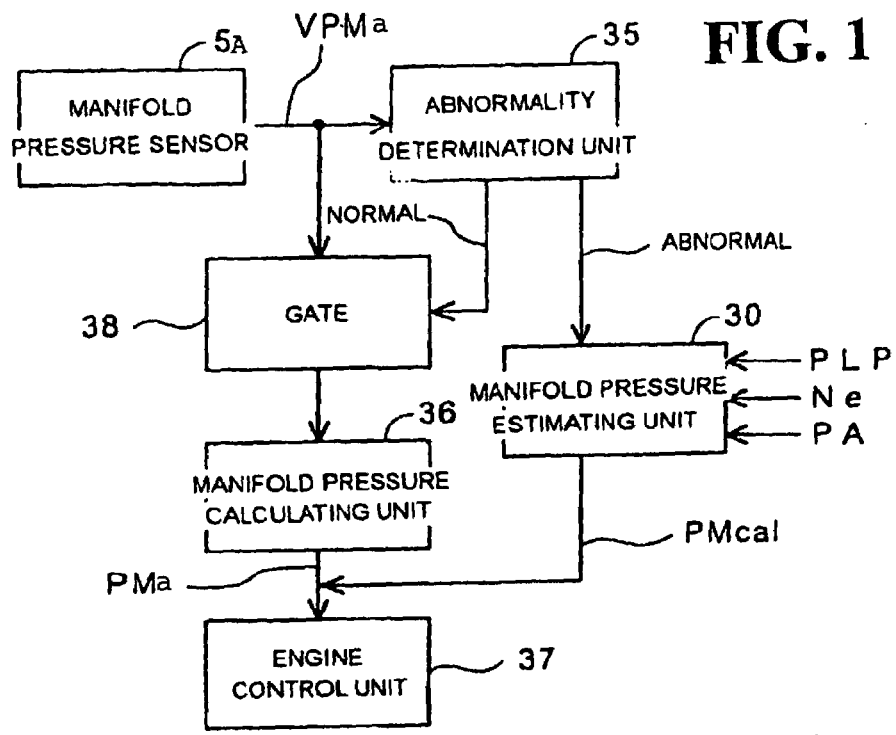
FIG. 1 is a block diagram showing a function of a principal portion of a diagnostic apparatus according to an embodiment of the present invention.

An embodiment of the present invention will now be described with reference to the accompanying drawings, wherein the same or similar elements will be identified with the same reference numeral.

Figure 2:
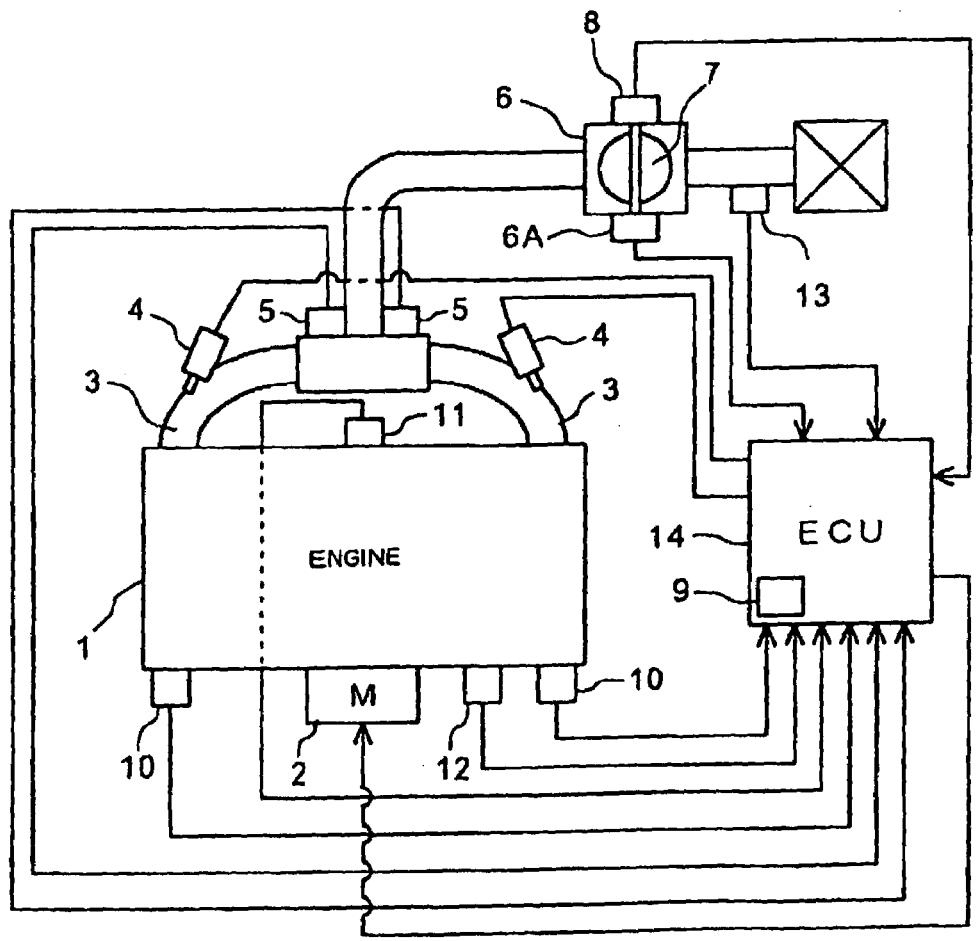
FIG. 2 is a general drawing showing an engine control system including the diagnostic apparatus according to the embodiment of the present invention.

FIG. 2 is a block diagram of a principal portion of an apparatus for controlling an engine including a failure diagnostic apparatus. In FIG. 2, an engine 1 is a reciprocal internal combustion engine for an airplane, and is provided with a starter motor 2 for activation. Although components for two cylinders are shown in FIG. 2, the number of cylinders in the engine 1 is not limited. An intake manifold 3 of the engine 1 is provided with fuel injection valves 4 and manifold pressure sensors 5. The manifold pressure sensors 5 are located on the upstream side of the fuel injection valves 4 for detecting a pressure in the intake manifold 3. In order to differentiate the two manifold pressure sensors 5, the one for main control will be referred to hereinafter as a first manifold pressure sensor 5A and the one for back-up will be referred to hereinafter as a second manifold sensor 5B.

A throttle body 6 is provided on the upstream side of the manifold pressure sensor 5. A throttle valve 7 is assembled in the throttle body 6. The throttle valve 7 is driven by a motor 8. The throttle body 6 is provided with a throttle sensor 6A for detecting a throttle opening. Known sensors required for controlling the engine such as an atmospheric pressure sensor 9, a cam pulser 10, a crank pulser 11, a cooling water temperature sensor 12, and an air temperature sensor 13, etc. are further provided for controlling the engine 1.

An electronic control unit (ECU) 14 is also included for performing fuel injection or ignition control according to a program upon reception of output signals from the respective sensors described above. The ECU 14 includes a failure diagnostic function for the manifold pressure sensors 5.

Figure 3:
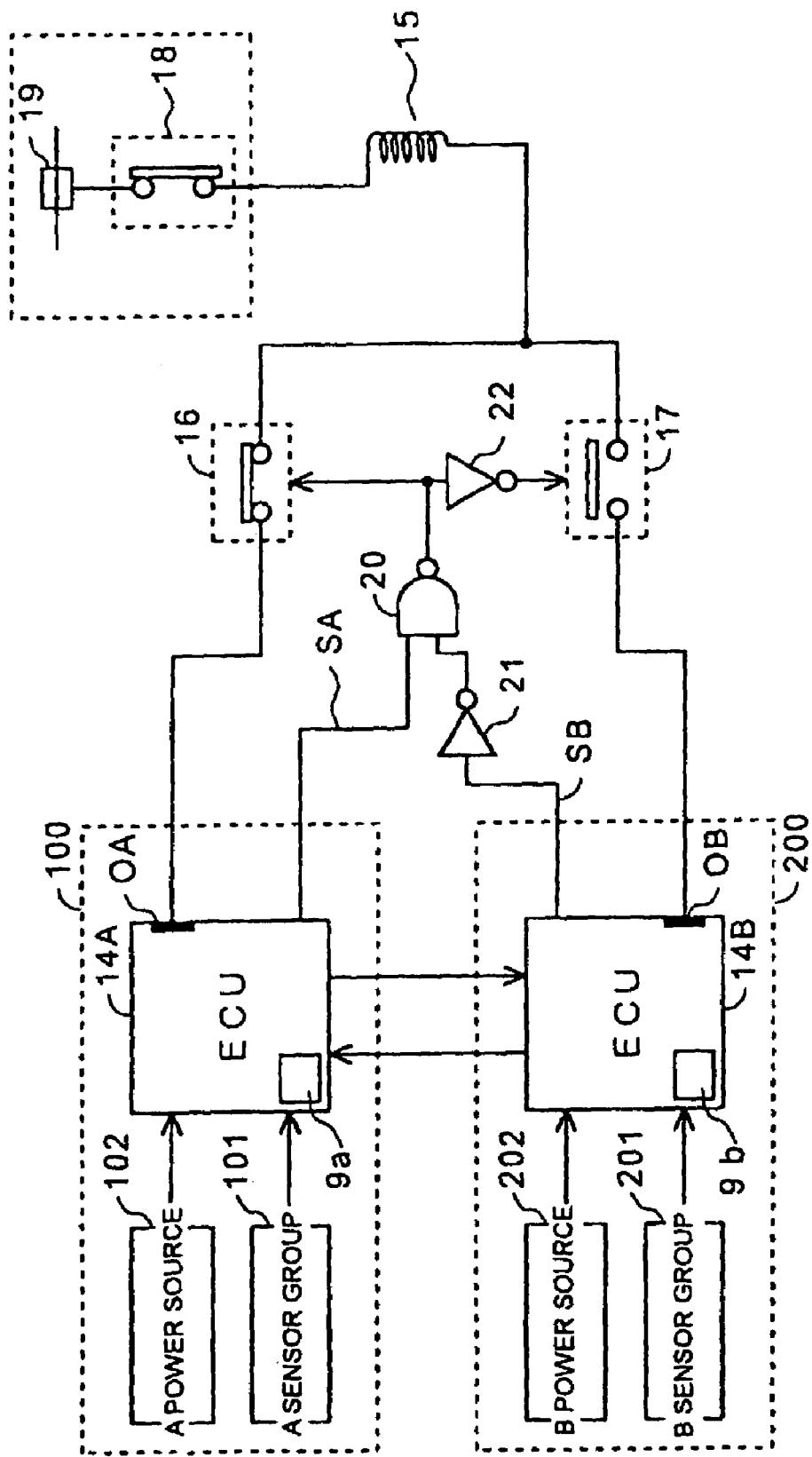
FIG. 3 is a block diagram showing a principal portion of the engine control system including the diagnostic apparatus according to the embodiment of the present invention.

FIG. 3 is a block diagram showing a general structure of the engine control system described above. As shown in FIG. 3, the control system of this embodiment is provided with two systems of detection circuits for the sensors and the ECUs 14 as failsafe devices. These systems are referred to as an A lane 100 and a B lane 200, respectively. The A lane 100 includes an A sensor group 101 including the sensors described in conjunction with FIG. 2, an A power source 102, and an ECU 14A for the A lane. Likewise, the B lane 200 includes a B sensor group 201, a B power source 202, and an ECU 14B for the B lane. The first manifold pressure sensor 5A is included in the A sensor group 101, and the second manifold pressure sensor 5B is included in the B sensor group 201. Although the atmospheric pressure sensors 9 (9a and 9b) are provided on circuit boards which constitute the ECU 14A and the ECU 14B or in housings (not shown) of the ECUs 14A and 14B in this embodiment, the positions of installation of the atmospheric pressure sensors 9 are not limited thereto.

The ECUs 14A and 14B are capable of communicating with each other in both ways via communication interfaces of one another, not shown. One end (minus side) of each drive coil of the fuel injection valve 4 provided for each cylinder (only one is shown) 15 is connected to injection signal output terminals OA and OB of the ECUs 14A and 14B, respectively, via change-over switches 16, 17. The other end of the drive coil 15 is connected to a power source 19, which outputs, for example, a voltage of 14 V via a power switch 18. The power switch 18 is provided with a current control function. The power sources 19 and the power switches 18 are provided in the ECUs 14A and 14B, respectively.

A switching signal SA outputted form the ECU 14A is connected to an input side of an AND circuit 20 on one side. A switching signal SB outputted from the ECU 14B is connected to an input side of the AND circuit 20 on the other side via a NOT circuit 21. The output from the AND circuit 20 is supplied to the change-over switch 16 and to a change-over switch 17 via another NOT circuit 22.

Power is distributed from the power source 19 to the drive coil 15 depending on the condition of the injection signal output terminal of the lane which is connected to one of the change-over switches 16, 17 selected by the switching signals SA and SB. The valve-open duration of the fuel injection valve 4, i.e. the amount of fuel injection, is determined by the duration of this power distribution.

The diagnosis of the manifold pressure sensor of the main control A lane 100 and compensation in case of failure will be described below. The B lane 200 can be used for assisting the A lane 100 when the A lane 100 is brought into an abnormal state and the lane switching is performed. In this case, an example of using a substitute value without switching the lane in the case in which the A lane 100 is in the abnormal condition will be described.

Figure 4:
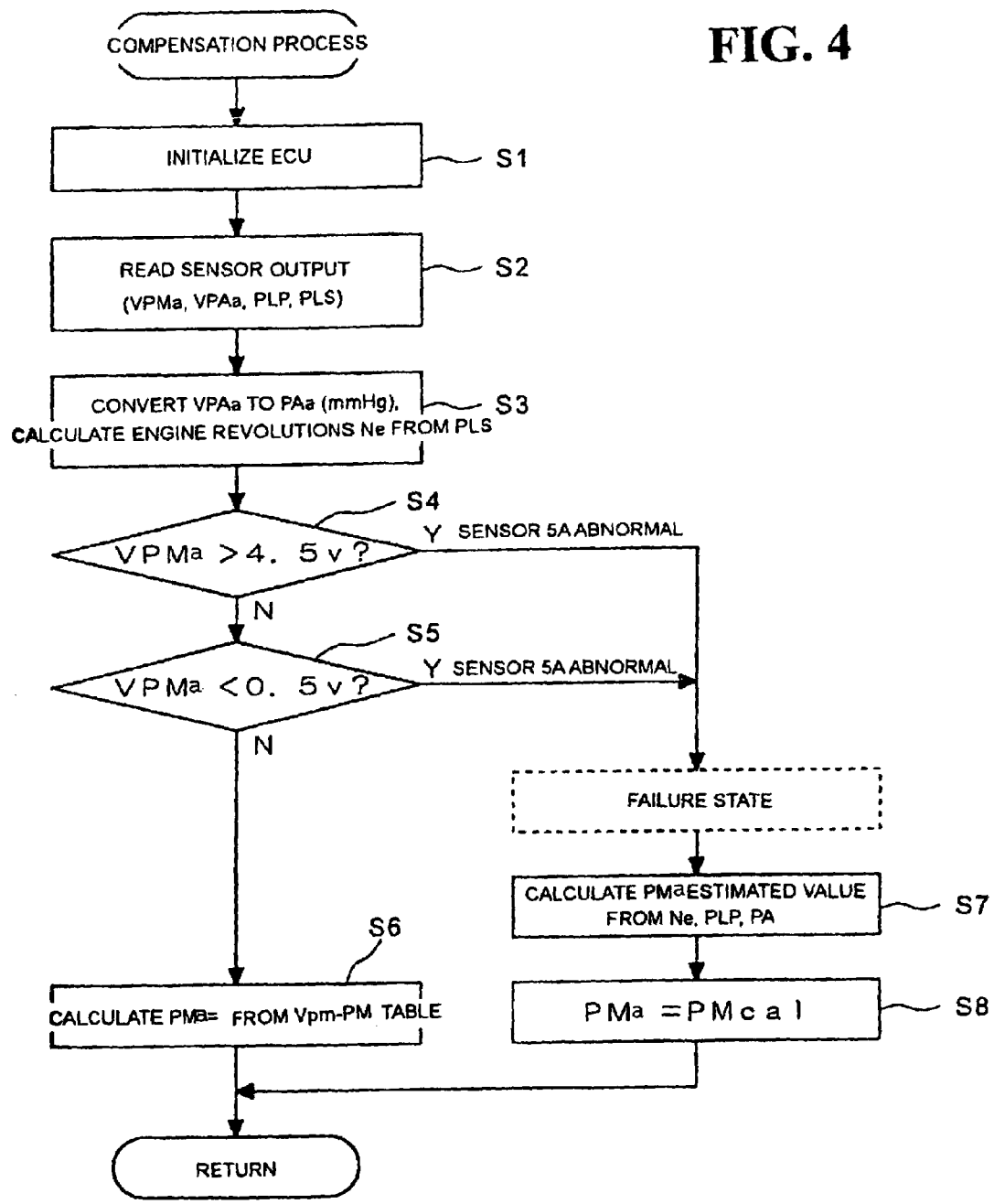
FIG. 4 is a flowchart showing a process of the principal portion of the diagnostic apparatus according to the embodiment of the present invention.

FIG. 4 is a flowchart of the failure diagnostic process of the manifold pressure sensor 5A. In Step S1, the ECU 14A is initialized. In Step S2, an output voltage VPMa of the first manifold pressure sensor 5A of the A lane 100, an output voltage VPAa of the atmospheric pressure sensor 9a of the A lane 100, an output PLP of the throttle sensor 6A, and a crank pulse PLS outputted from the clank pulser 11 of the A lane 100 are read.

In Step S3, a physical value PAa (mm Hg) of the atmospheric pressure is calculated on the basis of the output voltage VPAa. For example, the output voltages are converted into physical values using a prepared conversion table, respectively. In Step S3, the engine revolution Ne is calculated on the basis of the crank pulse PLS, for example by intervals of the crank pulses PLS.

In Step S4, whether or not the output voltage VPMa of the manifold pressure sensor 5A exceeds a predetermined upper limit value (4.5 V in this case) is determined. If the determination is negative, the procedure goes to Step S5.

In Step S5, whether or not the voltage VPMa is smaller than a predetermined lower limit value (0.5 V for example) is determined. If the determination in this step is negative, the procedure goes to Step S6, where a manifold pressure PMa is calculated referring to the conversion table on the basis of the output voltage VPMa of the manifold pressure sensor 5A.

When the determination in Step S4 is affirmative, it is determined that the manifold pressure sensor 5A has failed due to short circuit or the like. Therefore, the procedure goes to Step S7. In Step S7, an estimated manifold pressure value PMcal is calculated as a substitute of the output value of the manifold pressure sensor 5A on the basis of the engine revolution Ne (rpm), the throttle opening PLP (%), and the atmospheric pressure PAa (mmHg).

When the determination in Step S5 is affirmative as well, it is determined that the manifold pressure sensor 5A has failed due to disconnection or the like. Therefore, the procedure goes to Step S7 where the estimated manifold pressure value PMcal is calculated.

The estimated manifold pressure value PMcal calculated in Step S7 is used as a substitute value of a manifold pressure value PMa detected by the manifold pressure sensor 5A (Step S8).

Subsequently, a specific example of relations among an atmospheric pressure PA, the engine revolution Ne, the throttle opening PLP, and the manifold pressure PMa used for obtaining the estimated manifold pressure value PMcal will be described.

Figure 5:
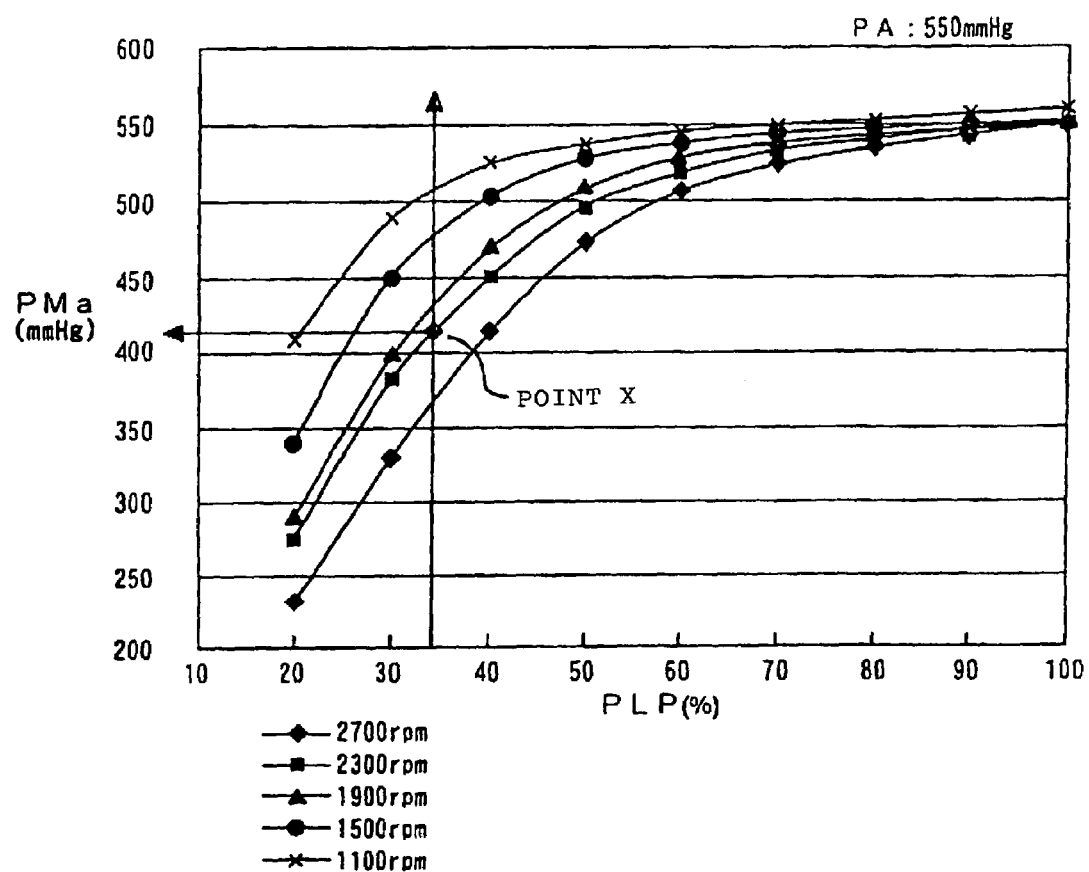
FIG. 5 is a drawing showing an example of a data table used in calculation of an estimated manifold pressure.

FIG. 5 is a data table showing the relations among the engine revolution Ne, the atmospheric pressure PA, the manifold pressure PMa, and the throttle opening PLP. The data is obtained when the atmospheric pressure PA is set to 550 mm Hg in the test apparatus in which the atmospheric pressure PA can be set to various values, and the engine 1 is operated at various numbers of revolutions Ne. The vertical axis represents the manifold pressure PMa, and the lateral axis represents the throttle opening PLP. The atmospheric pressure PA of 550 mm Hg, which is obtained when an airplane having the engine 1 mounted thereon is cruising at a height of 8000 feet in the air is assumed to be as a representative atmospheric pressure.

Using the data shown in FIG. 5, the manifold pressure PMa when the engine revolution Ne is 2300 rpm, and the throttle opening PLP is 35% is obtained. In FIG. 5, when an intersection between a line of 35% in the throttle opening PLP (vertical line) and a curved line representing 2300 rpm in the engine revolution Ne is represented as a point X, the manifold pressure PMa at the intersection X can be read. In other words, the estimated manifold pressure value PMcal can be obtained. The estimated manifold pressure value PMcal obtained here is 420 mm Hg. The data shown in FIG. 5 is stored in a memory unit in the ECUs 14A, 14B. The estimated manifold pressure value PMcal can be calculated by performing a functional calculation or a linear interpolation.

Figure 6:
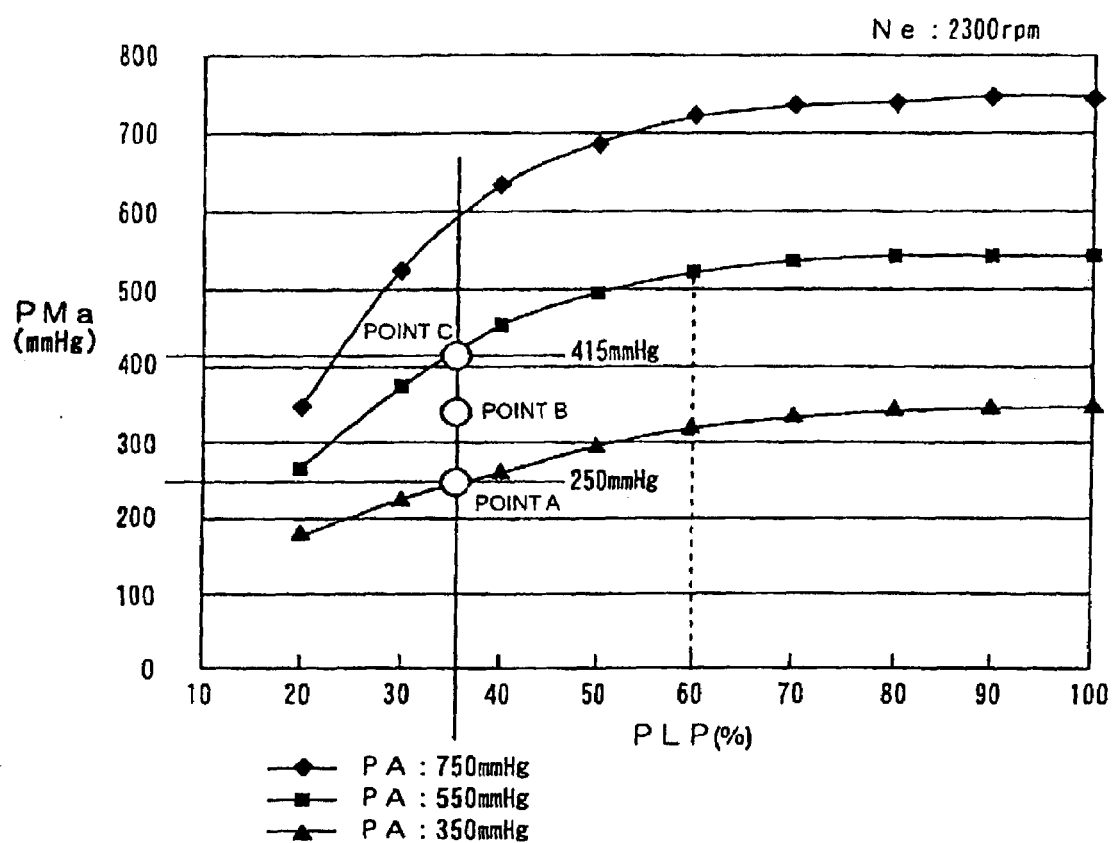
FIG. 6 is a drawing showing another example of the data table used in calculation of the estimated manifold pressure.

FIG. 6 is a drawing showing a relation between the manifold pressure PMa at various atmospheric pressures (750 mm Hg, 550 mm Hg, and 350 mm Hg) and the throttle opening PLP when the engine revolution Ne is 2300 rpm.

A procedure without using the representative atmospheric pressure, but using data in a characteristic curve as in FIG. 6 for obtaining the estimated manifold pressure PMcal at an intermediate atmospheric pressure which is not on the characteristic curve, will be described. For example, assuming a flight at a height of 9500 feet, an example in which the atmospheric pressure PA is 520 mmHg, the engine revolution Ne is 2300 rpm, and the throttle opening PLP is 35% will be described. First, intersections between a line (vertical line) showing 35% in the throttle opening PLP and the characteristic lines of 350 mm Hg and 550 mm Hg in the atmospheric pressure PA are represented in FIG. 6 as a point A and a point C, respectively. An intersection B between the virtual characteristic curve of 520 mm Hg in the atmospheric pressure and the line of 35% in the throttle opening PLP is supposed to be at a midpoint between the point A and the point C.

The manifold pressure PMa indicated by the point B can be obtained by interpolating on the basis of the coordinates of the point A, the point B, and the point C. In other words, the coordinates of the respective points A, B, C (PLP, PMa, and PA) are A (35, 250, 350), B (35, PMa, 520), and C (35, 415, 550). The manifold pressure PMa is calculated by the following expression.

$$PMa=250+(415-250)/(550-350)\times(520-350)$$

According to this expression, the manifold pressure PMa is obtained as 390 mm Hg, i.e. the estimated manifold pressure value PMcal is obtained as 390 mm Hg.

For example, by creating the data tables as shown in FIG. 6, in increments of 500 rpm from 500 rpm to the upper limit of usage 3000 rpm and storing these tables in the ECUs 14A and 14B, the estimated manifold pressure value PMcal according to various numbers of engine revolutions can be calculated.

FIG. 1 is a block diagram showing a function of a principal portion of the ECU 14A, which performs the process described in conjunction with the flowchart in FIG. 4. An abnormality determination unit 35 determines the existence of an abnormality in the manifold pressure sensor 5A depending on whether the output voltage VPMa of the manifold pressure sensor 5A is out of a predetermined voltage range (for example, 0.5 V to 4.5 V). If the manifold pressure sensor 5A is normal, the output voltage VPMa is supplied to a manifold pressure calculating unit 36. The manifold pressure calculating unit 36 includes a coordinate table between the voltage value VPMa and the pressure value PMa, and outputs the pressure value PMa corresponding to the inputted voltage value VPMa. The manifold pressure PMa is supplied to an engine control unit 37 and is used to calculate the amount of fuel injection or the timing of ignition.

When the manifold pressure sensor 5A is brought into a failed state, the estimated manifold pressure value PMcal is calculated in a manifold pressure estimating unit 30. The estimated value PMcal is supplied to the engine control unit 37 as the manifold pressure PMa.

In this manner, when the manifold pressure sensor is brought into a failed state, the estimated manifold pressure value is calculated using the output from a sensor other than the manifold pressure sensor, which is determined to be failed. For example, the engine revolution, the throttle opening or the atmospheric pressure can be used instead of the manifold pressure. The calculated value is used as a substitution of the output of the manifold pressure sensor to continue the engine control.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling an engine having a manifold pressure sensor, an atmospheric pressure sensor, an engine revolution detector, and a throttle sensor, said method comprising the steps of:
    calculating an estimated manifold pressure value on the basis of an engine revolution, a throttle opening and an atmospheric pressure when the manifold pressure sensor has failed; and
    performing fuel injection control by using the estimated manifold pressure value as a representative output value of the manifold pressure sensor.

2. The method of controlling an engine according to claim 1, further comprising the steps of:
    obtaining an output voltage of the manifold pressure sensor, an output voltage of the atmospheric pressure sensor, an output of the throttle sensor and an output of the engine revolution detector; and
    calculating a physical value of the atmospheric pressure on the basis of the output voltage of the atmospheric pressure sensor.

3. The method of controlling an engine according to claim 2, further comprising the steps of:
    determining whether the output voltage of the manifold pressure sensor is between a predetermined lower limit and a predetermined upper limit; and
    if the output voltage is not between the predetermined lower limit and the predetermined upper limit, then it is determined that the manifold pressure sensor has failed, and said steps of calculating the estimated pressure value and performing fuel injection control are carried out.

4. The method of controlling an engine according to claim 2, further comprising the steps of:
    determining whether the output voltage of the manifold pressure sensor is between a predetermined lower limit and a predetermined upper limit;
    if the output voltage is between the predetermined lower limit and the predetermined upper limit, then it is determined that the manifold pressure sensor has not failed, and the manifold pressure is calculated from an output of the manifold pressure sensor.

5. The method of controlling an engine according to claim 4, wherein said step of calculating the manifold pressure from an output of the manifold pressure sensor includes the step of using a coordinate table between the output voltage of the manifold pressure sensor and the atmospheric pressure value calculated from the output voltage of the atmospheric pressure sensor to calculate the manifold pressure, said method further comprising the step of performing fuel injection control by using the calculated manifold pressure value.

6. The method of controlling an engine according to claim 1, further comprising the steps of:
    determining whether the output voltage of the manifold pressure sensor is between a predetermined lower limit and a predetermined upper limit; and
    if the output voltage is not between the predetermined lower limit and the predetermined upper limit, then it is determined that the manifold pressure sensor has failed, and said steps of calculating the estimated pressure value and performing fuel injection control are carried out.

7. The method of controlling an engine according to claim 1, further comprising the steps of:
   determining whether the output voltage of the manifold pressure sensor is between a predetermined lower limit and a predetermined upper limit;
   if the output voltage is between the predetermined lower limit and the predetermined upper limit, then it is determined that the manifold pressure sensor has not failed, and the manifold pressure is calculated from an output of the manifold pressure sensor.

8. The method of controlling an engine according to claim 7, wherein said step of calculating the manifold pressure from an output of the manifold pressure sensor includes the step of using a coordinate table between an output voltage of the manifold pressure sensor and an atmospheric pressure value calculated from an output voltage of the atmospheric pressure sensor to calculate the manifold pressure, said method further comprising the step of performing fuel injection control by using the calculated manifold pressure value.

9. An apparatus for controlling an engine having a manifold pressure sensor, an atmospheric pressure sensor, an engine revolution detector, and a throttle sensor, comprising:
   a failure diagnostic unit that detects an abnormality of the manifold pressure sensor;
   a pressure calculating unit that outputs an estimated manifold pressure value in response to input of an engine revolution, a throttle opening, and an atmospheric pressure value according to mutual relations among preset values of the engine revolution, the throttle opening, the manifold pressure, and the atmospheric pressure value; and
   an engine control unit that performs fuel injection control using the estimated manifold pressure value as a typical value of the output value of the manifold pressure sensor when an abnormality is detected in the manifold pressure sensor.

10. The apparatus for controlling an engine according to claim 9, wherein the failure diagnostic unit obtains an output voltage of the manifold pressure sensor, an output voltage of the atmospheric pressure sensor, an output of the throttle sensor and an output of the engine revolution detector and calculates a physical value of the atmospheric pressure on the basis of the output voltage of the atmospheric pressure sensor.

11. The apparatus for controlling an engine according to claim 10, wherein the failure diagnostic unit determines whether the output voltage of the manifold pressure sensor is between a predetermined lower limit and a predetermined upper limit, and if the output voltage is not between the predetermined lower limit and the predetermined upper limit, the failure diagnostic unit determines that the manifold pressure sensor has failed, and the pressure calculating unit outputs the estimated manifold pressure value and the engine control unit performs fuel injection control.

12. The apparatus for controlling an engine according to claim 10, wherein the failure diagnostic unit determines whether the output voltage of the manifold pressure sensor is between a predetermined lower limit and a predetermined upper limit, and if the output voltage is between the predetermined lower limit and the predetermined upper limit, the failure diagnostic unit determines that the manifold pressure sensor has not failed, and the pressure calculating unit calculates the manifold pressure from the output voltage of the manifold pressure sensor.

13. The apparatus for controlling an engine according to claim 12, wherein the pressure calculating unit calculating the manifold pressure from the output voltage of the manifold pressure sensor by using a coordinate table between the output voltage of the manifold pressure sensor and the atmospheric pressure value calculated from the output voltage of the atmospheric pressure sensor to calculate the manifold pressure, and said engine control unit performs fuel injection control by using the calculated manifold pressure value.

14. The apparatus for controlling an engine according to claim 9, wherein the failure diagnostic unit determines whether the output voltage of the manifold pressure sensor is between a predetermined lower limit and a predetermined upper limit, and if the output voltage is not between the predetermined lower limit and the predetermined upper limit, the failure diagnostic unit determines that the manifold pressure sensor has failed, and the pressure calculating unit outputs the estimated manifold pressure value and the engine control unit performs fuel injection control.

15. The apparatus for controlling an engine according to claim 9, wherein the failure diagnostic unit determines whether the output voltage of the manifold pressure sensor is between a predetermined lower limit and a predetermined upper limit, and if the output voltage is between the predetermined lower limit and the predetermined upper limit, the failure diagnostic unit determines that the manifold pressure sensor has not failed, and the pressure calculating unit calculates the manifold pressure from the output voltage of the manifold pressure sensor.

16. The apparatus for controlling an engine according to claim 15, wherein the pressure calculating unit calculating the manifold pressure from the output voltage of the manifold pressure sensor by using a coordinate table between an output voltage of the manifold pressure sensor and an atmospheric pressure value calculated from an output voltage of the atmospheric pressure sensor to calculate the manifold pressure, and said engine control unit performs fuel injection control by using the calculated manifold pressure value.

* * * * *